United States Patent [19]

Haas et al.

[11] 3,755,781

[45] Aug. 28, 1973

[54] COMMUNICATION SYSTEM POLLING METHOD

[75] Inventors: Lee C. Haas; Lynn P. West, both of Raleigh, N.C.

[73] Assignee: International Business Machines Corporation, Armonk, N.Y.

[22] Filed: Aug. 28, 1972

[21] Appl. No.: 284,308

[52] U.S. Cl. .......................... 340/147 R, 340/172.5

[51] Int. Cl. .............................................. H04q 5/00

[58] Field of Search ......................... 340/147 R, 163

[56] References Cited

UNITED STATES PATENTS 3,629,831 12/1971 Mikus et al. ..................... 340/163 X 3,633,164 1/1972 Hynes et al. .................... 340/147 R 3,652,993 3/1972 Bridwell et al. ................. 340/147 R

*Primary Examiner*—Donald J. Yusko

*Attorney*—Edward H. Duffield et al.

[57] ABSTRACT

A polling scheme is disclosed in which a plurality of remote terminals or stations sharing a single communication channel are polled by a central station at a high speed to solicit responses therefrom. The central station can effectively handle responses from only one remote station at a time and, since a plurality of stations are polled, the possibility of contention between more than one remote station trying to respond during the same time period exists. If contention does occur, a second poll of possible contenders is conducted at a slow rate of speed to resolve the contention.

12 Claims, 4 Drawing Figures

COMMUNICATION SYSTEM POLLING METHOD

FIELD OF THE INVENTION

This invention relates generally to communication systems in which a central station is linked via a communications channel to a plurality of remote stations. More specifically, it relates to a full duplex communications system, or to a channel having similar characteristics, in which the remote stations can only communicate with the central when they are polled by polling signals from the central.

RELATED APPLICATIONS

This invention is related to co-pending application, Ser. No. 284310, filed Aug. 28, 1972 concurrently herewith and assigned to a common assignee herewith, in which a further improvement on the basic method set forth herein is claimed.

PRIOR ART

A variety of polling schemes are generally known in the art. In this context, polling is defined as a process of addressing one of the numerous remote stations, connected to a central station via a common data link, by signals from a central or control station. All of the various remote stations connected to the transmission link receive this address or polling signal, but only one of said stations recognizes the address or polling code received as its own and is thereby enabled to transmit over the data link any information which it may be passing to the central. Polling is, then, a combination of solicitation and enabling wherein a coded enabling signal addressed to a particular, identifiable remote station enables only that station to utilize the communication link shared by the other remote stations with the central. Polling is generally considered a means of soliciting data from one of a plurality of remote terminals. The term selection is also often used to describe enabling a terminal to receive data.

In the usual prior art arrangements, a master station or control unit serves to accumulate traffic, which may consist of messages or data, from the multiple remote stations and then to pass this traffic to its destination, which may be either a central data bank or processor or another remote station. This process is generally conducted using a polling scheme where it is desired to share a channel among a plurality of remote units.

In the usual polling schemes, each remote station is invited, in turn, to send inbound traffic by polling signals sent out by the master station or central. The outbound polling signals are usually coded and are in the form of a unique address which will be recognized by only one of the remote stations. A given remote station may, upon the receipt of a polling signal (which is the invitation to respond and the enabling signal which allows the station to respond) do, in general, one of several things: it may begin to send any messages which it has awaiting the opportunity for transmission, or, it may send back an aswer code indicating that it has no traffic for transmission at that time. Finally, the remote station may not give a response at all. Polling schemes utilizing some or all of these alternatives individually or in combination have been previously known.

In each of the prior art systems, however, the usual strategy of polling is to pause after polling each individual remote station and await a response of one of the several types mentioned above. The condition of no response has usually been defined as a timeout period within which, if no response is received, the system determines that no response will be forthcoming and proceeds to poll the next station in sequence. This is the conventional polling scheme and it proceeds generally as follows: The central or master station transmits a polling code or address for one remote station; all of the remote stations receive this polling address or code, but only one of them recognizes it as its own, and the particular station recognizing its address or polling code is enabled to either transmit over the commonly shared communications link; the central station waits to receive a response from the particular polled station; if a response is forthcoming, the central station receives it and it usually may conduct an error checking routine based on one of the many data checking procedures commonly utilized; the central then transmits a polling signal for another station, until all stations have been given an opportunity to use the channel.

As detailed above, the normal sequence of polling operation requires a pause between polling of the individual remote stations which is long enough to allow the polled station to send back a response. In general, if the central station does not detect a response within a defined time limit, it assumes that a particular remote station has either malfunctioned or is not capable of responding. This pause constitutes a minimum time lag between polling each station. It is a significant factor and is one of the chief drawbacks in operation of such a system since it imposes rather stringent limitations on the number of remote stations which can be served by one central station within a given time period. In the field of data communications, particularly digital data communications where service to a large number of remote stations is desired, reduction of such time lags is of utmost importance to allow the service of a maximum number of remote stations during a given time period. Prior art systems based on the aforementioned polling schemes have, in general, not been able, due to these time lags, to serve large number of remote stations on a single data link or channel without creating unsatisfactory, uneconomical time delays.

OBJECTS OF THE INVENTION

In view of the foregoing shortcomings in the generally known prior art communications systems, it is an object of this invention to improve the polling scheme in a communication system by reducing the waiting time between polling signals and thereby increasing the number of remote stations which may be served in a given time period.

It is also an object of this invention to provide an improved method of managing a communications channel in a party line or shared channel system.

It is a further object of this invention to provide an improved method of reducing contention among various polled remote stations.

BRIEF DESCRIPTION OF THE DRAWINGS

FIG. 1A illustrates in schematic form the typical representation of well-known duplex data communication channel configurations in which a central station is connected to a plurality of remote stations. Such a system is characterized in that the inbound path to the central station and the outbound path from the central station are independent and may handle traffic simultaneously. In the particular case illustrated, the outbound path carries information simultaneously received by all remote stations, while the inbound path is shared by all remote stations, only one of which may transmit at any given time if contention between sending stations is to be avoided. To achieve an orderly inbound traffic flow, the central station will invite individual stations to send their traffic on the inbound data path, in turn, by polling them and then waiting or pausing at least long enough for the polled station to send back a response. This amount of pause consitutes a minimum time lag between polls.

Call the time lag between polls $T_r$ and let the time required for the central station to poll an individual station be called $T_p$. It can be seen then that the time required to poll a group of N remote stations, assuming that none of them have traffic to send, is $N \times (T_p + T_r)$. This is also the minimum time between polls for the individual terminals, again assuming that none of the terminals have traffic ready to send. If the time $T_r$ is relatively large, i.e., on the order of several character times at the transmission speed of the data link, then the total response time for numerous stations will contribute significantly to the polling delay at the various stations. That is, the greater the number of stations to be served and the larger the quantity $T_r$, the longer each station will have to wait before it can possibly be polled to send in its messages to the central. The key to the present invention lies in reducing the time between polls by reducing or eliminating $T_r$ and $T_p$.

The present invention utilizes what we choose to term "overlap polling" and it reduces the quantity $T_p$ to one character time at the transmission medium speed, while $T_r$ is largely eliminated. Unlike conventional polling, in which an individual remote station is polled and the central station awaits a response, the central station will not pause between polls to examine the individual remote station responses; instead, the central station continues to poll other stations while it awaits a response from previously polled stations. The scheme works in the following manner: first of all, it is assumed that each remote station can respond to a polling signal in one of two ways; it may send any messages which it has ready for transmission or, it may send nothing. Each remote station is designed to send traffic, if it has any messages for transmission, when it is polled. The polling message or code transmitted by the central station consists of a start of poll character, utilized to alert the individual stations that polling address codes will follow, which character is followed by a series of terminal addresses for the terminals being polled.

Figure 1A:
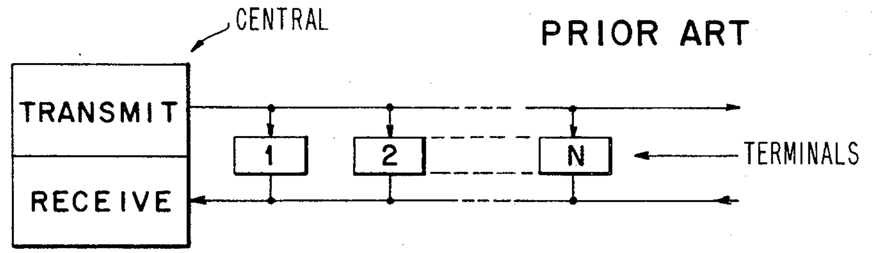
FIG. 1A PRIOR ART
FIG. 1A illustrates in schematic form a typical full-duplex communication system in which a central station shares a communication channel with a plurality of remote stations as known in the prior art.
Figure 1B:
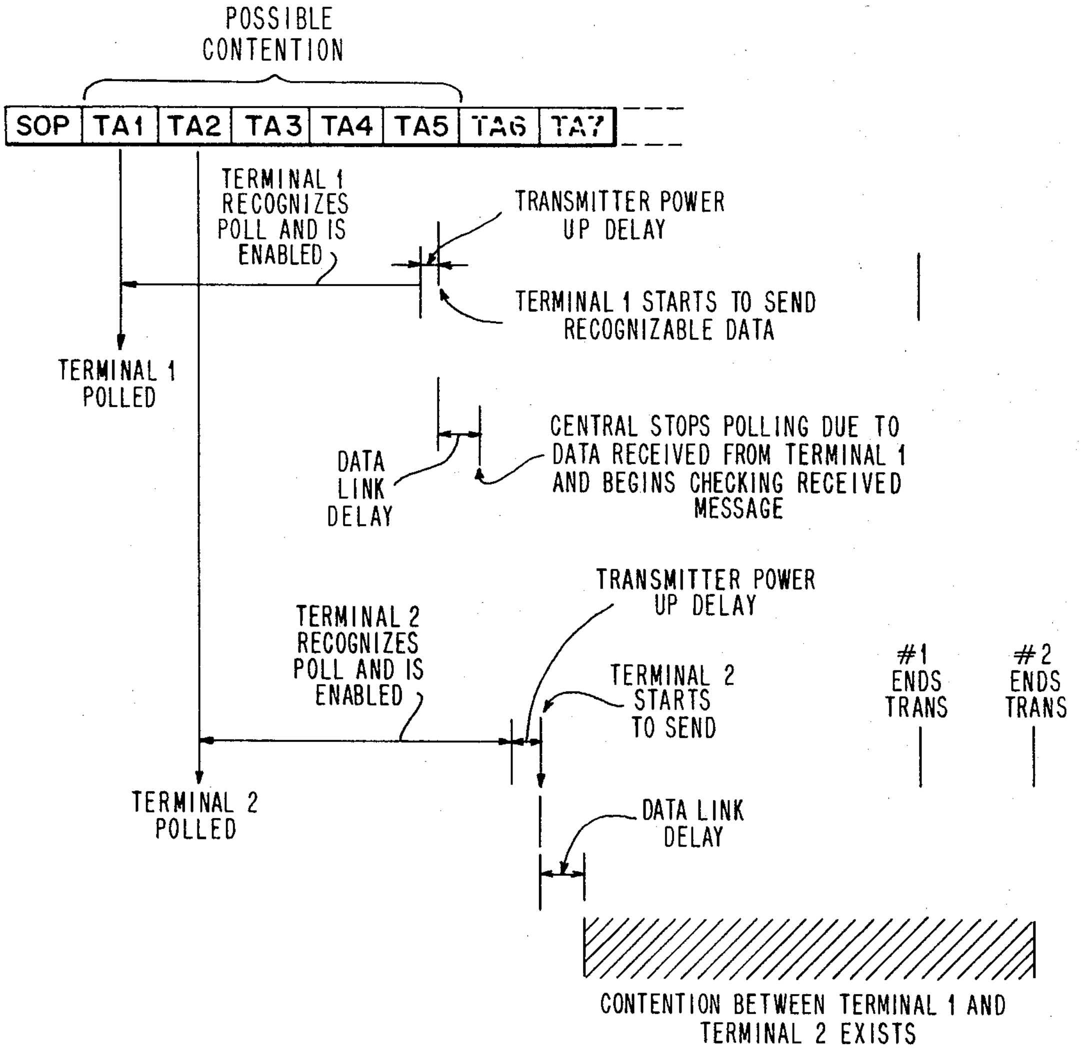
FIG. 1B illustrates in schematic form the typical polling format and responses in the method of the present invention.

In FIG. 1B the top portion illustrates a typical polling sequence starting with the SOP (Start of Poll character) and followed by TA1, TA2, TA3, TA4, etc., which are representative of terminal addresses or station addresses. The particular station or terminal addresses would consist of a number of bits of data arranged in a code of sufficient capacity to identify all of the stations or terminals on the communications channel.

In the example illustrated in FIG. 1B, two stations, 1 and 2, are assumed to have traffic for transmission. Receipt of the polling signal TA1 by station 1 triggers the transmission of data to the central station. The receipt of polling code TA2 by terminal 2 triggers its start of transmission also. In the scheme illustrated, as soon as the central station detects the start of receipt of transmission from any terminal, in this case terminal 1, it stops polling. In the case illustrated, the second terminal begins to send one character time after terminal 1 has begun to send its data. These two transmissions will, of course, become garbled and interfere with one another at the input to the central station. This condition is described as contention or conflict in the inbound data path.

When contention does occur, it is necessary to resolve the contention by the following procedure: the central station waits until all inbound transmission has stopped and then the central station individually polls those stations on a list of possible contending stations by polling in a conventional fashion in which each station is individually polled while the central awaits the response or for a timeout to occur.

The two stages of polling may be described as a fast poll mode and the slow poll mode. It is clear that, when in the fast poll mode, contention among responding stations or terminals is always possible. The number of possible contending stations at any time is the number of stations which may be polled after a terminal which has traffic available for transmission has been polled. This number is determined by the polling speed and by the reaction time of the stations or terminals which have traffic to send. Knowing the number of possible contenders and the inbound message rates, it is possible to compute the probability that contention will occur. As the inbound traffic rate increases, the probability of contention among stations also increases, making it necessary to revert to conventional polling more and more frequently. The inbound traffic rate can rise to such a level that all terminals will be conventionally polled at which point there is no advantage in the fast polling strategy. However, when the expected loading characteristics of communication channel in a given system are known, it is possible to compute a given number of terminals or stations which may be polled in the fast poll mode without creating an unacceptably high probability of contention occurring. This, in turn, enables the user of the overlap polling technique to economize greatly on the use of central station time and to serve a much larger number of remote stations within a given period of time since repolling at the conventional rates can be reduced. For example, under given loading conditions in a given system, a probable contention rate of 5 to 10 percent is acceptable and a plurality of terminals can be polled during a given time period without contention occurring in the majority of instances, thus reducing the aforementioned $T_r$ and $T_p$ parameters to very low levels.

Figure 2A:
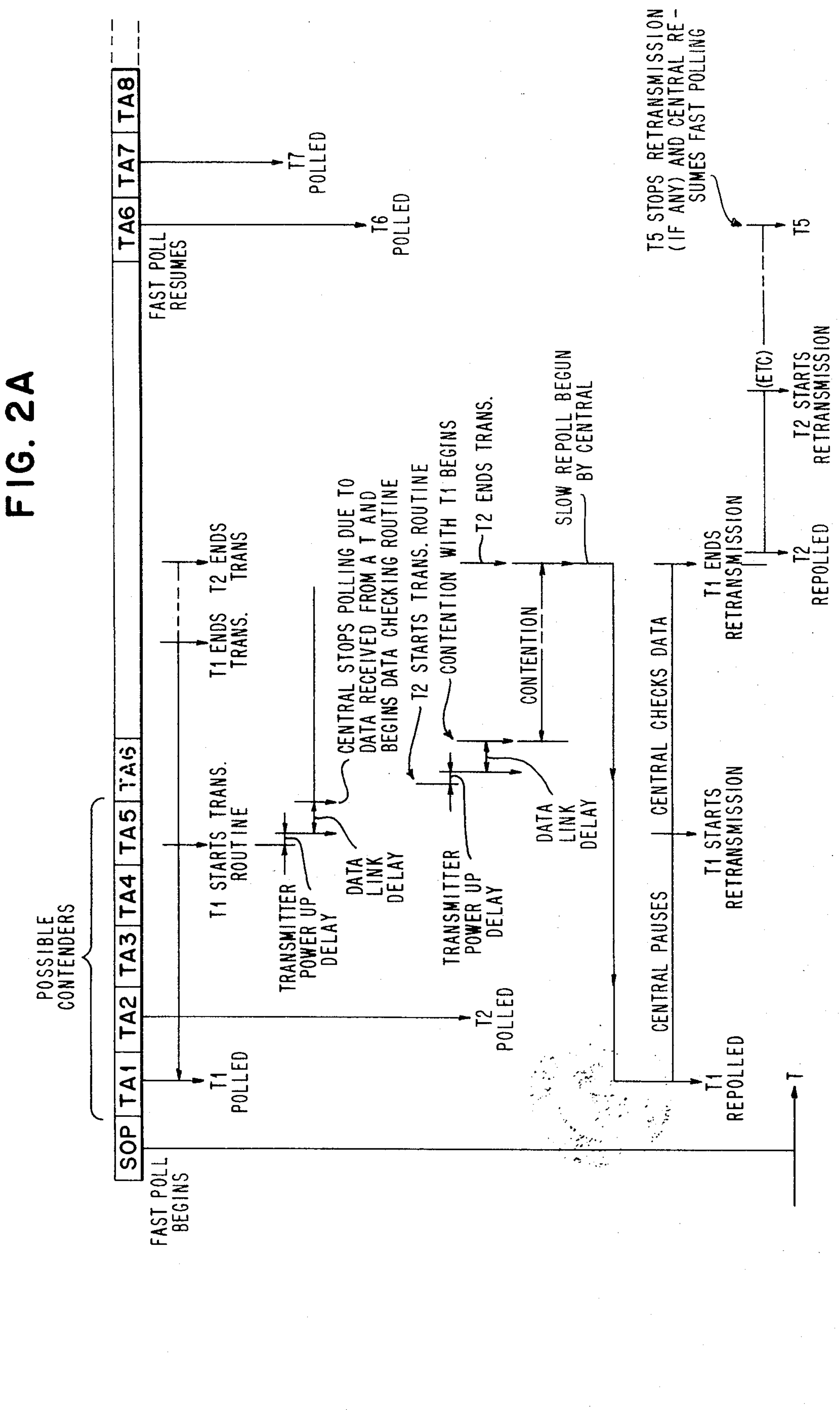
FIG. 2A graphically illustrates the improved polling method of the present invention in greater detail.

Turning to FIG. 2A, an expanded version of FIG. 1B is illustrated in which a complete sequence of events passing between the central and a plurality of remote stations or terminals is graphically charted. The number of stations which are possible sources of contention are those stations which have been polled at the fast polling rate between the time that a station having data to send is enabled, in this case T1, and the time it actually sends data which is received at the central, at which time polling stops. In the case illustrated in FIG. 2A, terminals T1 through T5 are possible contenders since they are all enabled by the fast poll routine before the central stops the fast polling due to the receipt of data from T1 and begins its checking routine. Also in the illustration, it is assumed that T2 has data to send. As illustrated, contention occurs when the data from T2 is received at the central and overlaps data being received from T1. At the end of all transmissions from T1, T2, and any other terminals which may also be in contention during this period of time, the central begins a slow repoll routine beginning with the first of the possible contenders and running through the last station polled at the time polling was stopped. This routine is illustrated at the bottom portion of FIG. 2A and when it is completed, the fast poll routine is resumed as illustrated at the top of FIG. 2A.

Figure 2B:
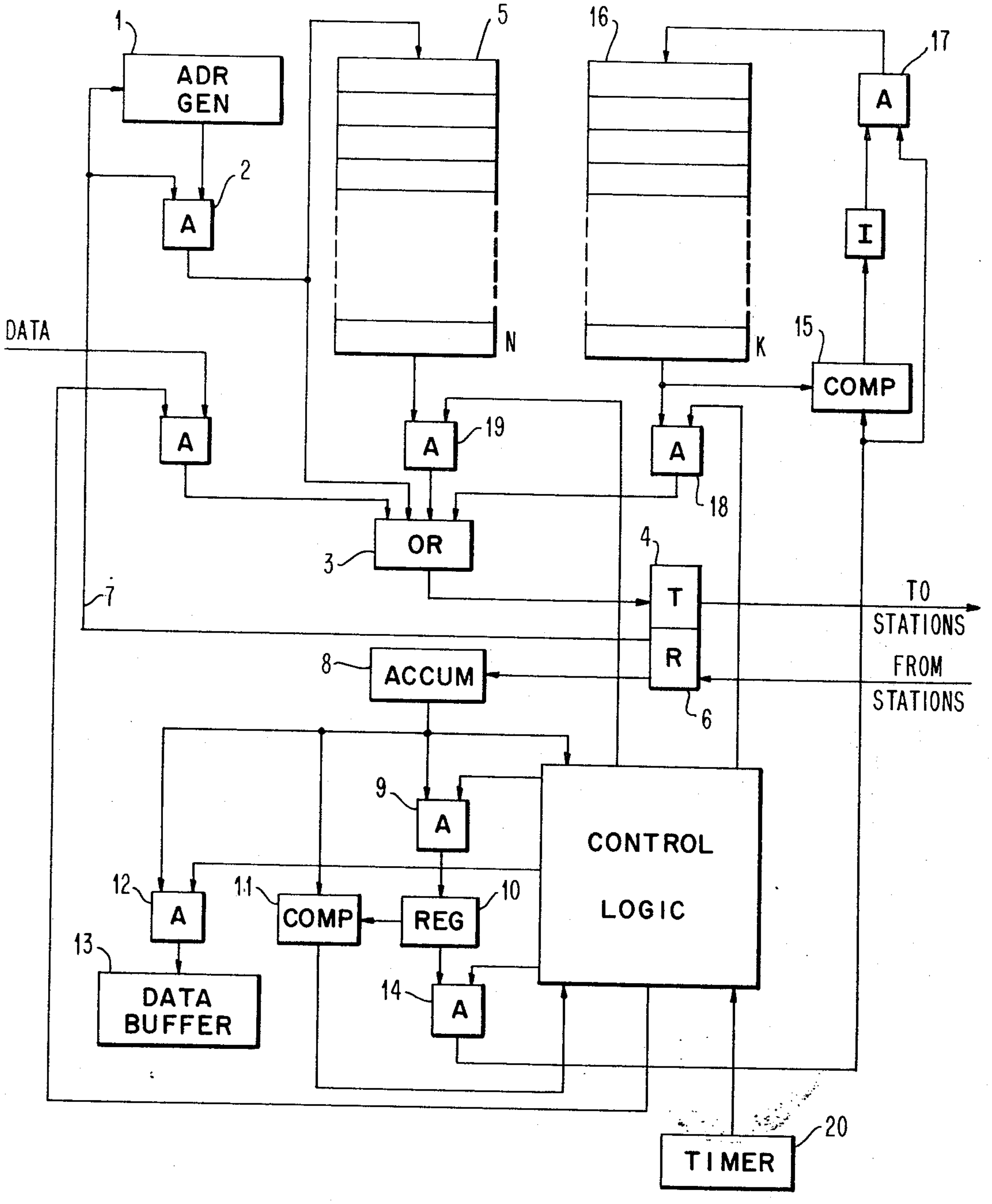
FIG. 2B illustrates an embodiment of an apparatus adapted to perform the method of the invention.

It is obvious that if some of the first terminals or stations polled, such as TA1, TA2, TA3, etc., do not have messages ready for transmission, but for example, TA4 does have data ready, (but TA5, TA6, etc., do not have) there will be no contention and the slow polling routine will not be entered. As a corrolary, it is also obvious that, if sufficient time passes following the enabling of previous terminals in the polling list, they may be dropped from the list of possible contenders as too much time would have passed from them to respond if any response is forthcoming at all. FIG. 2B illustrates a simple means of embodying this refinement.

As shown in FIG. 2B, in schematic form, the method of the present invention may be embodied in a simple form using well-known hardware components. Address generator 1 is utilized to provide a series of polling addresses or signals in the sequence in which it is desired to poll the various stations sharing the communications link. Address generator 1 may be as simple as a cyclical binary counting device or can be easily refined and embodied in a general purpose computer by using a section of core storage for compiling lists of the stations which are to be polled and putting them in some desired order for polling. The added flexibility of programming an address generator in this form is desirable since active terminals or stations can be interspersed with less active etations to reduce the probability that contension may occur during any polling sequence. Similarly, the address generator in this form can be made sensitive to commands which identify particular stations as being "out-of-order" etc., for removal from the polling list temporarily.

Addresses from address generator 1 are passed through AND gate 2 and OR gate 3 to transmitter 4 which sends the polling signals to the plurality of stations shared on the communication line. Addresses from generator 1 are also passed through AND gate 2 into temporary register 5 which contains N stages of memory.

Register 5 is of the shifting type well-known in the art in which each new block of data forces preceding blocks to one higher stage in the register. Register 5 contains N stages where N is defined as being equal to the maximum expected time it will take to poll any given station, to activate that station, and to receive a response therefrom divided by the high speed polling rate at which stations are accessed. In other words, register 5 contains sufficient stages N to insure that a record will be kept of all of the terminal or station addresses polled which have had at least enough time since being polled in which to respond but will omit, by shifting out addresses from the last stage of the register when it is full, the addresses of any stations or terminals which have had more than a sufficient amount of time in which to respond. The contents of register 5 defines the total list of all possible contenders during any polling sequence since addresses which are not found in register 5 either have not been polled or have been polled too long ago to cause contention since no response will be forthcoming from those stations.

Upon the receipt of any incoming signal at receiver 6, control line 7 is raised to decondition AND gate 2 and stop passage of polling signals into register 5 and through OR gate 3 to transmitter 4. Control line 7 also deconditions address generator 1 to stop the production of polling addresses.

Incoming terminal address and frame sequence signals are received by receiver 6 and fed to accumulator 8 which has sufficient space to accumulate enough bits to form a single character, such as a given terminal address. When accumulator 8 is full, its contents are shifted through AND gate 9 into register 10 under the control of the control logic block illustrated in in FIG. 2B. The next ensuing incoming character is accumulated in accumulator 8 and, when accumulator 8 is full, its contents are compared against the previous character terminal address stored in register 10 by a comparison in comparator 11. If a true compare condition is found, i.e., if the first terminal address received matches the second terminal address received, the control logic block will condition AND gate 12 to allow the passage of following data into data buffer 13 for use by the control system. If the results of the comparison are not true, control logic will pass the first character content of register 10 through AND gate 14 to comparator 15 where the character will be serially compared against the contents of temporary register 16. Register 16 is cleared at the start of each polling sequence, and, assuming no match is found between the contents of register 16 and character from register 10, the character from register 10 will be entered through AND gate 17 into register 16 for temporary storage as a terminal address which does not match the address then appearing in accumulator 8. This is an indication that possible contention exists and that the first terminal address stored in register 16 will have to be repolled during the slow poll sequence of repolling contenders. If no further contention occurs, and data received is free from error, the comparison and data passing routines will continue for the second terminal address recognized until transmissions have ceased. Otherwise, if contention does occur, additional terminal addresses as identified will be entered into register 16 for later repolling.

When all transmissions have ceased, the control logic will condition either AND gate 18 or 19 and will, under control of slow polling rate timer 20, pass the addresses stored in registers 5 or 16 through the appropriate AND gate and into OR 3 for transmission through transmitter 4 to the various stations. If terminal addresses were recognized and found to be in contention, the control logic block will gate AND gate 18 and repoll the contents of register 16. If no terminal addresses could be identified but contention was found to exist due to garbled data, etc., AND gate 19 will be conditioned by the control logic and the total list of all terminals then polled which have had a sufficient amount of time to respond or less will be repolled at a slow rate. These addresses are the contents of register 5.

As defined previously, the slow polling proceeds at a rate which allows the transmission of a polling address followed by a sufficient waiting period to allow the receipt of any response which may be forthcoming from the addressed terminal. Timer 20 controls the slow polling rate whereas address generator 1 provides the basic high speed polling rate. When repolling has been completed, registers 5 and 16 are cleared by the control logic and, the lack of incoming signals from receiver 6 will decondition control line 7 allowing address generator 1 and AND gate 2 to resume with the polling sequence.

An improvement on the foregoing system and method can be made based on the probability that, given a known usage or traffic density in the channel, not more than two polled stations will actually come into conflict at any one time. This improvement in operating methods can be visualized by referring again to FIG. 2A. In FIG. 2A, once contention has been discovered, a repolling process is entered which is continued until all of the possible contenders have been repolled at the slow polling rate. This causes a significant delay in the resumption of high speed polling in the situation where two stations separated by several stations having no traffic to send have been polled, and it results in a long delay due to the slow polling of a number of stations having no input which are included in the possible list of contenders.

The improved method of operation proceeds as follows: normal fast polling as defined in the invention is conducted until a response is received. The response is checked as received as defined in the invention and, if contention is detected, the slow polling routine is begun. However, once a single station having traffic to send has been found in the slow polling routine, and its traffic has been received, the slow poll is discontinued in a departure from the methods illustrated in the basic invention, and the fast polling routine is resumed immediately. Provided that no more than two stations actually were in contention when contention was found to exist, this method resolves the contention by eliminating one of the two contenders. The second contender will be picked up and handled during the high speed polling routine which is resumed.

Overlap polling is sensitive to the system error rate in bits found to be in error. For example, if the system error rate is relatively low, such as $10^{-5}$ error bits as a fraction of correct bits, the members of the slow polling lists may be enabled one by one as illustrated in FIG. 2A until a second terminal with traffic to send is lcoated. All other members, if any, of the slow poll list may then be returned to the fast polling list. If one or more of the remaining members of the slow poll list thus returned to the fast poll list has traffic, it will be enabled during the ensuing fast polling routine. However, a second case exists where the system error rate is high, such as $10^{-3}$ bit error rate. This case exists where interference or contention between terminals is not always distinguishable from noise. For a system with this high an error rate, noise corruption will cause unsuccessful transmission which will appear as contention to the receiver and this will occur fairly often. In such a case, the slow poll list is created and slow polling is conducted far more often than in a system with a low bit error rate and an undue amount of time is used in conducting slow polling.

The foregoing improvement on the basic invention alleviates this difficulty in that slow interrogation or polling is only conducted until the first terminal having traffic is identified and its message has been received, then all others from the slow poll list are returned to the high speed polling list. Inclusion of this refinement in the basic system has resulted in approximately halving the mean response time required to service all of the stations on the system when compared to the time required to individually poll all members in the slow poll lists generated in a system having a high bit error rate.

The foregoing inventions have been embodied in a mobile terminal communications system in which a two-way radio data link is utilized and in which up to 250 separate mobile units may communicate in the same channel with a central station. The implementation of the two improved polling methods has made it possible to service this great number of terminals or stations in a single channel at a rate which is sufficiently high to make each individual station appear to its user to have sole use of the channel since response time between a request for access and the receipt of an activating poll signal is short.

It is obvious that the control techniques for generating the fast and slow polling lists described above and for implementing the control functions and temporary storage operations for handling the polling of the members in these lists may be implemented on a general purpose computer instead of being embodied in hardware and logic circuitry as illustrated in FIG. 2B, since the programming required will generate, in the computer, the full equivalent of these operations and functional members. The method of operating the polling scheme remains the same in either case whether the implementation is carried out on a general purpose computer or in the type of hardware described in the figures; therefore, we do not wish to be limited in the appended claims to the specific structures described but claim basic methods and techniques as our new and useful contribution to the arts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a communication system having a central station and a plurality of remote, individually pollable stations which may communicate with said central station when polled thereby, the improved method of operating said system, comprising the steps of:

polling a plurality of said remote stations within a time period which is less than the time within which any of said plurality of stations can respond, thereby soliciting message inputs to said central station;

halting said polling upon the receipt by said central station of a response from any of said plurality of polled remote stations;

checking said response as received by said central station to determine whether conflicting responses from more than one said remote station exist during all or part of the time during which a receipt of a response from any of said stations is occurring; and, when said conflicting responses occur, repolling said remote stations to eliminate conflicting responses after said responses have ceased by polling each said remote station and then pausing after each polling for a length of time not less than the time in which any of said stations can respond to receive any response said polled station may have, said repolling being conducted only until a response from any station has been fully received; and resuming said polling step when said response has ceased.

2. The method of operating a communication system as described in claim 1, wherein:

said polling of a plurality of said remote stations is conducted at a first rate which exceeds the rate at which said remote stations can respond; and said repolling of said stations is conducted at a second rate which is not greater than the rate at which said stations can respond.

3. The method of operating a communication system as described in claim 1, wherein:

said halting of said polling is performed immediately upon the start of receipt of any response at said central station, thereby reducing the number of stations which may have to be repolled by reducing the number of said stations polled initially.

4. The method of operating a communication system as described in claim 1, wherein:

said repolling step is performed only for said remote stations encompassed by a group beginning with the first said station polled which has had not greater than a defined minimum time period following polling in which to respond, and ending with the last said station polled at the time said halting step was begun.

5. The method of operating a communication system as described in claim 4, wherein said repolling group is further defined by steps comprising:

comparing the time between the polling of each said station and the receipt of any said response against a defined minimum time period; and listing for possible repolling those said stations which have had less time than said defined minimum in which to respond.

6. The method of claim 5, wherein:

said minimum time period being that in which any said station can respond with a complete message.

7. The method of operating a communication system as defined in claim 5, wherein:

said comparing is accomplished by loading the polling signals sequentially as sent out by said central station into a storage device having N stages of storage, N being defined as equal to the time required for any station to respond divided by the polling rate, so that, when said storage is full, each ensuring poll signal entered will force out of the earliest entered poll signal from said storage device so that its record of being polled will be destroyed and it will not be repolled if repolling is done, the N stages of storage assurring that said record is not destroyed until a sufficient time has elapsed since polling to allow said station to respond.

8. In a communication system having a central station and a plurality of remote, individually pollable stations which may communicate with said central station when polled thereby, the improved apparatus for operating said system, comprising:

means for polling a plurality of said remote stations within a time period which is less than the time within which any of said plurality of stations can respond, thereby soliciting message inputs to said central station;

means for halting said polling upon the receipt by said central station of a response from any of said plurality of polled remote stations;

means for checking said response as received by said central station to determine whether conflicting responses from more than one said remote station exist during all or part of the time during which a receipt of a response from any of said stations is occurring;

means for repolling said remote stations when said conflicting responses occur to eliminate conflicting reSponses after said responses have ceased by polling each said remote station and then pausing after each polling for a length of time not less than the time in which any of said stations can respond to receive any response said polled station may have; and control means connected to said polling means and responsive to the reception of a response from any of said stations, for resuming said polling immediately upon the end of said reception.

9. A communications system apparatus as described in claim 8 wherein:

said polling means includes a control means for clocking said polling at a first rate which exceeds the rate at which said remote stations can respond; and said repolling means includes a control means for clocking said repolling at a second rate which is not greater than the rate at which said stations can respond.

10. A communications system apparatus as described in claim 9, further comprising:

means responsive to and connected with said polling means, for listing for said repolling by said repolling means only said remote stations encompassed by a group beginning with the first said station polled which has had not greater than a defined minimum time period following polling in which to respond, and ending with the last said station polled at the time said halting step was begun.

11. A communications system apparatus as described in claim 10, wherein:

said listing means is connected to and responsive to said polling means to list said stations for repolling at said first controlled polling rate of said polling means; and said listing means is adapted to remove said stations from said list in the order in which they were listed therein after a time delay at least equal to a defined minimum period within which any given said station which has been polled can respond.

12. A communications system apparatus as described in claim 11, further comprising:

detecting means connected to said halting means and to said remote stations for detecting the start of receipt of any response from said stations and, responsive to said receipt of a response, for signalling said halting means to halt immediately, thereby reducing the number of said stations which may have to be repolled by reducing the number of said stations polled initially.

* * * * *

PO-1050
(5/69)

UNITED STATES PATENT OFFICE
CERTIFICATE OF CORRECTION

Patent No. 3,755,781 Dated August 28, 1973

Inventor(s) Lee C. Haas and Lynn P. West

It is certified that error appears in the above-identified patent and that said Letters Patent are hereby corrected as shown below:

Claim 7, Column 9, line 59, change "ensuring" to --ensuing-- and after "out" delete "of".

Signed and sealed this 27th day of November 1973.

SEAL)
ttest:

DWARD M.FLETCHER,JR.
ttesting Officer

RENE D. TEGTMEYER
Acting Commissioner of Patent